(12) United States Patent
Bansal et al.

(10) Patent No.: US 8,379,651 B2
(45) Date of Patent: Feb. 19, 2013

(54) SELECTIVELY DISABLING RELIABILITY MECHANISMS ON A NETWORK CONNECTION

(75) Inventors: Deepak Bansal, Redmond, WA (US); Hasan Alkhatib, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/552,328

(22) Filed: Jul. 18, 2012

(65) Prior Publication Data
US 2012/0284403 A1  Nov. 8, 2012

Related U.S. Application Data

(63) Continuation of application No. 12/717,784, filed on Mar. 4, 2010, now Pat. No. 8,248,944.

(51) Int. Cl.
*H04L 12/56* (2006.01)
(52) U.S. Cl. .................. 370/395.52; 709/230
(58) Field of Classification Search .......... 709/227, 709/228, 230, 231, 232, 237, 250; 370/395.52, 370/389
See application file for complete search history.

(56) References Cited

U.S. PATENT DOCUMENTS

| | | | |
|---|---|---|---|
| 6,208,620 B1 * | 3/2001 | Sen et al. | 370/231 |
| 7,089,312 B2 * | 8/2006 | Liu et al. | 709/227 |
| 7,441,036 B2 * | 10/2008 | Bomer et al. | 709/228 |

* cited by examiner

*Primary Examiner* — Brenda H Pham
(74) *Attorney, Agent, or Firm* — Shook, Hardy & Bacon L.L.P.

(57) ABSTRACT

Computerized methods, systems, and computer-storage media for establishing and managing a transmission control protocol (TCP)-based tunnel ("tunnel") are provided. The tunnel spans between a data center and a private enterprise network and connects endpoints, of a service application, that reside in each location. During communication, the endpoints transmit data packets over one or more channels (e.g., higher-level channel and lower-level channel) that comprise the tunnel. Each of the channels supports reliability mechanisms (e.g., congestion-control mechanism and loss-recovery mechanism) integrally running thereon, for ensuring complete data-packet delivery. To prevent unwarranted performance degradation caused by duplicative efforts of reliability mechanisms, a fabric controller is employed to selectively disable one or more of the reliability mechanisms individually. The selective disablement of the reliability mechanisms is invoked by predefined criteria, such as instructions from a service model or detected identity of a source/destination endpoint, and is invoked on a per network connection basis.

20 Claims, 6 Drawing Sheets

SELECTIVELY DISABLING RELIABILITY MECHANISMS ON A NETWORK CONNECTION

CROSS-REFERENCE TO RELATED APPLICATIONS

This application is a continuation of U.S. application Ser. No. 12/717,784, filed Mar. 4, 2010, now pending, entitled "SELECTIVELY DISABLING RELIABILITY MECHANISMS ON A NETWORK CONNECTION," herein incorporated by reference.

BACKGROUND

Large-scale networked systems are commonplace platforms employed in a variety of settings for running applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles a physical machine or a virtual machine running on a physical host. When the data center hosts multiple tenants (e.g., customer programs), these resources are optimally allocated from the same data center to the different tenants.

Customers of the data center often require business applications running in a private enterprise network (e.g., server managed by the customer that is geographically remote from the data center) to interact with the software being run on the resources in the data center. In this instance, a network connection between components of the business application and components of the software running in the data center is established. This network connection typically utilizes network transport protocols, such as transmission control protocol (TCP), to facilitate reliable delivery of packets over the network connection.

This TCP-based network connection, or TCP connection, is responsible for managing end-to-end message transfers across the independently operating private enterprise network and data center. For example, these tools may manage error control, segmentation, flow control, congestion control, and application addressing (e.g., port numbers). In operation, problematic network behavior, such as network congestion, and lost packets can be detected and ameliorated by these tools by requesting retransmission of lost packets, and changing the rate at which packets are sent to reduce congestion.

When a TCP-based connection is being run on top of another TCP connection, the interplay between these mechanisms employed by the inner TCP connection and the outer TCP connection can result into exaggerated retransmissions and flow throttling that in turn causes significant drop in performance of the overall connection. As such, employing emerging technologies to disable one or more of the tools associated with the layer(s) of TCP-based communication would enhance the throughput and performance of an established network connection while still ensuring reliable packet delivery and congestion control.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide systems, methods, and computer-readable media that configures tools (e.g., reliability mechanisms) integrally running within transmission control protocol (TCP)-based tunnels and that serves to combat unwarranted performance degradation caused by duplicative efforts of those tools. Typically, the TCP-based tunnels function as network connections between disparately located endpoints. For instance, the endpoints may include a source endpoint hosted by a cloud computing platform and a destination endpoint hosted by a resource within a private enterprise network.

Exemplary embodiments of these configuring tools pertain to selectively enabling and disabling reliability mechanisms (e.g., congestion-control mechanism and loss-recovery mechanism) individually on respective connections that comprise the TCP-based tunnel. In one instance, these channels include a lower-level TCP-based connection and an upper level TCP-based connection. In operation, application data packets are transmitted via the higher-level TCP-based connection running on top of the lower-level TCP-based connection.

In embodiments, a fabric controller may be employed to allow enablement (turn on) of the congestion-control mechanism and/or the loss-recovery mechanism built into the lower-level TCP-based connection. The selective disablement of one or more reliability mechanisms integrated within the lower-level TCP-based channel may be invoked by predefined criteria (e.g., instructions from the cloud computing service model, identity of a source endpoint, identity of a destination endpoint, and the like), and may be invoked on a per network connection basis. In this way, the tools of the higher-level TCP-based channel actively enforce a set of reliability rules that ensure complete and efficient delivery of data packets over the TCP-based tunnel, while one or more of the tools of the lower-level TCP-based channel are deactivated to reduce potential performance degradation resulting from redundant efforts thereof.

BRIEF DESCRIPTION OF THE DRAWINGS

Embodiments of the present invention are described in detail below with reference to the attached drawing figures, wherein.

DETAILED DESCRIPTION

Figure 1:
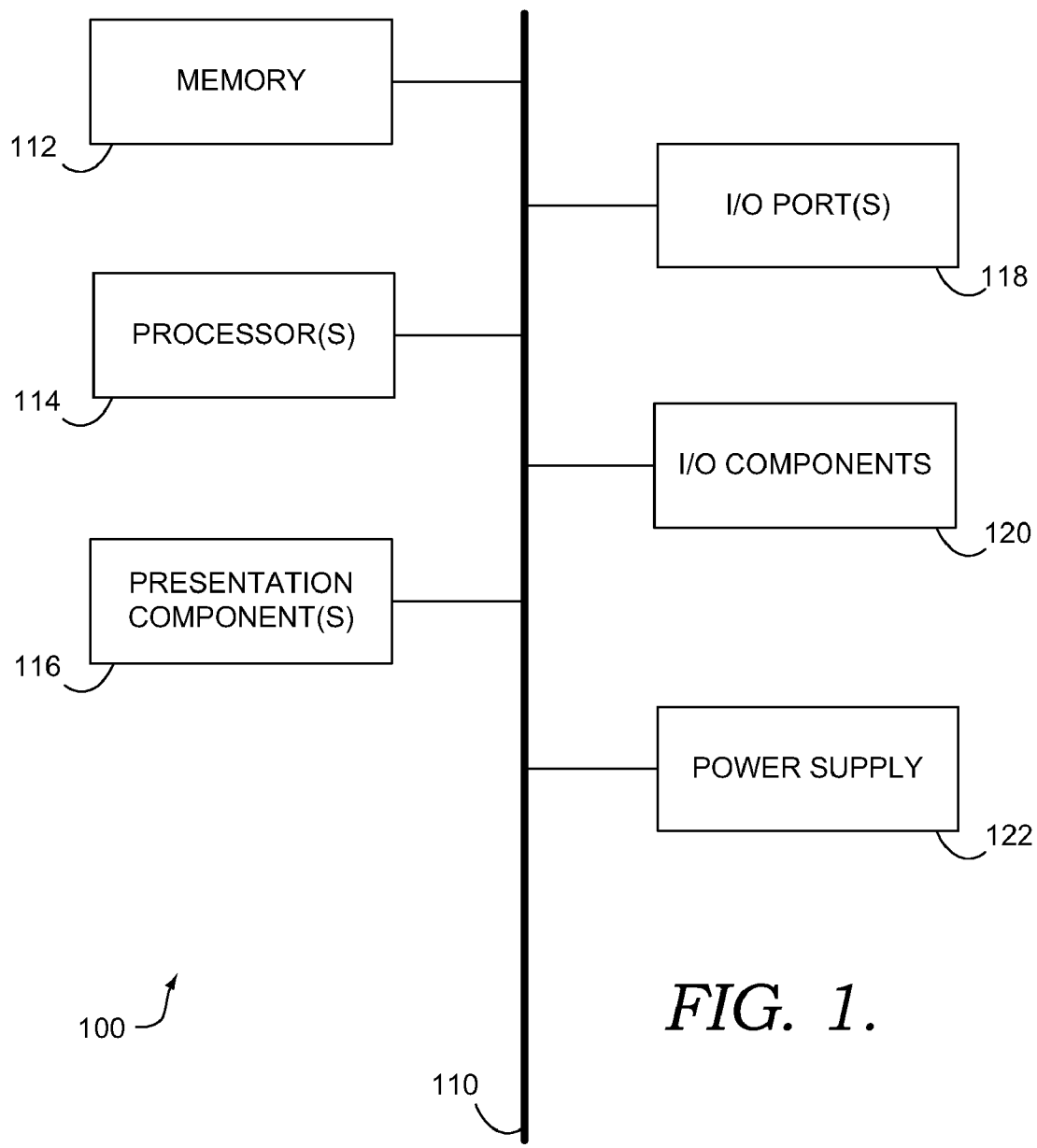
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, computer systems, and computer-readable media for establishing and configuring tunnels that span remotely located networks or endpoints within a connected network. As used herein, the term "tunnel" is meant to be limiting, but may encompass any network connection that communicatively links a source endpoint and a destination endpoint, with the intent to bridge communication over disparate networks. In one instance, a tunnel may be established as network connection that streams data packets between endpoints hosted in separate local networks, where the endpoints are discovered and identified by way of internet protocol (IP) addresses assigned thereto. Further, streaming data packets, and other traffic, may traverse multiple links, firewalls, and other security measures when traveling via a tunnel. This ostensibly direct connection between the endpoints allows both endpoints to talk in a similar manner as if they were positioned adjacently in a common network communicating via the IP layer.

In some embodiments, the tunnel is established using transport control protocol (TCP) or hypertext transfer protocol (HTTP), or HTTP Secure (HTTPS), respectively, in which the endpoints may or may not participate. The tunnel advantageously connects the endpoints and enable communication across a network or disparate networks. For instance, an HTTP or HTTPS tunnel offers the endpoints the ability to establish a direct virtual IP-level connection even when the end-points are in two disparate networks. In other words, the tunnel allows both endpoints to talk in the same manner as if they were positioned adjacently in a common network communicating via the IP layer. By way of example, a currently running application on the two end-points may not be aware that the endpoints thereof are residing in two disparate networks; thus, the application is not aware it is running on top of a tunnel. This feature of an HTTP or HTTPS tunnel is a product of the capability of HTTP and HTTPS-based network connections to bypass firewalls and other network edge devices such as proxy servers.

Further, the HTTP or HTTPS tunnels are supported by TCP-based connections that have end-to-end reliability mechanisms built therein, as TCP-based connections are utilized on a broad range of various networks. These reliability mechanisms perform functions, such as loss recovery and congestion control to deal with losses and congestion on these links that connect these various networks. In other words, TCP is provisioned with built-in reliability mechanisms for detecting packet-loss and detecting congestion, and for responding to each. In one instance, upon detecting congestion in a TCP-based connection, the reliability mechanism's response may be to reduce the rate at which the data-packet traffic is distributed across the network connection. In another instance, upon detecting lost packets in a TCP-based connection, the reliability mechanism's response may be to retransmit the lost data packets.

Potentially, there may be two or more TCP-based connections running on top of one another during an end-to-end TCP connection. In this situation, if packet loss or network congestion occurs, then the reliability mechanisms integrated in each of the layered connections respond independently to the packet loss and network congestion without communicating therebetween. For instance, a loss-recovery mechanism of a higher-level TCP-based connection may attempt to perform its own response in addition to a response from the loss-recovery mechanism of the lower-level connection. That is, both loss-recovery mechanisms resend the data, causing increased and unnecessary performance degradation of the network connection.

Also, both channels may have congestion-control mechanisms that may react to packet loss as a congestion issue and, upon operating in conjunction, duplicate their efforts when throttling the rate of transmission. For instance, if both congestion-control mechanisms reduce the rate of streaming data packets by half, the aggregate effect is a reduction in rate of a quarter, which is far slower than needed to resolve the packet-loss issue. Thus, these duplicative corrections, in effect, overcompensate for the cause and become ineffective. This overcompensation often creates an adverse impact on communication between the endpoints that increases latency beyond what is desirable to adequately address the pending packet loss or network congestion issues.

In one aspect, embodiments of the present invention relate to one or more computer-readable media having computer-executable instructions embodied thereon that, when executed, perform a method for communicating across a network connection established between a plurality of endpoints residing in disparate networks. Initially, the method includes a step of providing the network connection that spans between a source endpoint and a destination endpoint. As discussed above, the network connection operates as a TCP-based tunnel that bridges the disparate networks at which the source endpoint and the destination endpoint reside, respectively. The method further involves the steps of selectively disabling one or more lower-level reliability mechanisms, which are integrally running on the TCP-based tunnel, and communicating messages between the first endpoint and the second endpoint without the lower-level reliability mechanisms interfering with a timing at which the messages are sent. In embodiments, communicating messages between the first endpoint and the second endpoint may specifically include transmitting IP packets from the first endpoint to the second endpoint via the TCP-based tunnel.

In an exemplary embodiment, the lower-level reliability mechanisms comprise a congestion-control mechanism and a packet-loss mechanism. The congestion-control mechanism may be configured to manage an amount of data that is conveyed within the IP packets. The packet-loss mechanism may be configured to manage packet loss over the network connection by automatically retransmitting undelivered or delayed IP packets.

In another aspect, embodiments of the present invention relate to a computer system for managing a flow of data between endpoints that reside in individual local networks. Initially, the computer system includes the following elements: a data center within a cloud computing platform, a resource within the private enterprise network, a fabric controller, and a virtual machine. In embodiments, data center may host a source endpoint that is allocated to an application running on both the cloud computing platform and a private enterprise network. The resource may host a destination endpoint that is also allocated to the application. Upon initiating a communication therebetween, the source endpoint and the destination endpoint are connected by a tunnel that transports the data flow directly therebetween, where the tunnel may include a higher-level connection running on top of a lower-level connection. As discussed above, a congestion-control mechanism and a packet-loss mechanism are both built into each of the higher-level connection and the lower-level connection, respectively.

The fabric controller runs within the data center and is capable of establishing the tunnel and of configuring it. In one instance, configuring the tunnel includes selectively disabling the congestion-control mechanism and the packet-loss mechanism built into the lower-level connection. In another instance, configuring the connections may include selectively enabling the congestion-control mechanism and the packet-loss mechanism built into the higher-level connection.

The virtual machine within the data center generates first IP packets that are carried to the source endpoint on the higher-level connection. Upon receipt, the source endpoint (or the source tunnel termination end-point) encapsulates the first IP packets into second IP packets and transmits the second IP packets on the lower-level connection. As such, both connections are engaged when transmitting data packets between the endpoints of a TCP-based tunnel.

In yet another aspect, embodiments of the present invention relate to a computerized method for facilitating communication between a source endpoint and a destination endpoint across a TCP-based tunnel. In an exemplary embodiment, the method includes employing a fabric controller to establish the TCP-based tunnel that communicatively links the source endpoint and the destination endpoint over a network or across disparate networks. As mentioned previously, operation of the source endpoint is supported by a data center and operation of the destination endpoint is supported by a remotely located, resource residing on a private enterprise network managed by a client of the data center. The method additionally includes a step of receiving first IP packets at the source endpoint, which are passed from a virtual machine instantiated within a data center. These first IP packets are carried via a higher-level connection with a first set of reliability mechanisms provisioned thereon. The first IP packets are encapsulated into second IP packets at the source endpoint (or a source tunnel termination end-point in the same network as the source end-point) and transmitted over a TCP-based tunnel via a lower-level connection to a tunnel termination end-point in the destination network, then forwarded to the final destination—end-point in the remote network. Typically, the higher-level connection is provisioned with a second set of reliability mechanisms. These first and second sets of reliability mechanisms, in embodiments, each include a congestion-control mechanism and a loss-recovery mechanism, respectively.

The method continues by performing a step of employing the fabric controller to selectively disable the congestion-control mechanism and the loss-recovery mechanism provisioned on the lower-level connection. The fabric controller is also employed to passively allow the congestion-control mechanism and the loss-recovery mechanism provisioned on the higher-level connection to remain enabled. The disabled condition of the lower-level connection and the enabled condition of the higher-level connection are stored, at least temporarily. By way of clarification, the disabled condition represents the disablement of the congestion-control mechanism and/or the loss-recovery mechanism provisioned on the lower-level connection. On the contrary, the enabled condition represents the enablement of the congestion-control mechanism and the loss-recovery mechanism provisioned on the higher-level connection.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
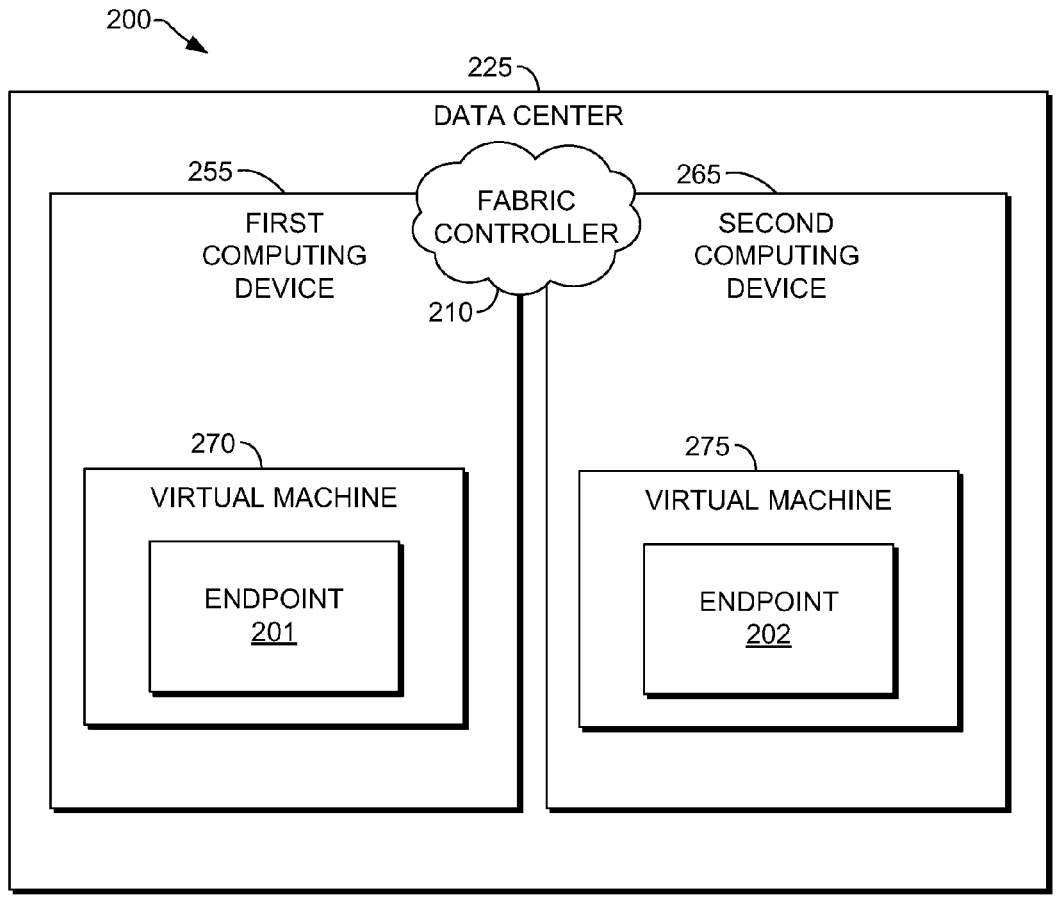
FIG. 2 is a block diagram illustrating an exemplary cloud computing platform, suitable for use in implementing embodiments of the present invention, that is provisioned to configure reliability mechanisms built into a transport control protocol (TCP)-based tunnel.

With reference to FIGS. 1 and 2, a first computing device 255 and/or second computing device 265 may be implemented by the exemplary computing device 100 of FIG. 1. Further, endpoint 201 and/or endpoint 202 may include portions of the memory 112 of FIG. 1 and/or portions of the processors 114 of FIG. 1.

Turning now to FIG. 2, a block diagram is illustrated, in accordance with an embodiment of the present invention, showing an exemplary cloud computing platform 200 that is configured to allocate virtual machines 270 and 275 within a data center 225 for use by a service application. It will be understood and appreciated that the cloud computing platform 200 shown in FIG. 2 is merely an example of one suitable computing system environment and is not intended to suggest any limitation as to the scope of use or functionality of embodiments of the present invention. For instance, the cloud computing platform 200 may be a public cloud, a private cloud, or a dedicated cloud. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

The cloud computing platform 200 includes the data center 225 configured to host and support operation of endpoints 201 and 202 of a particular service application. The phrase "service application," as used herein, broadly refers to any software, or portions of software, that runs on top of, or accesses storage locations within, the data center 225. In one embodiment, one or more of the endpoints 201 and 202 may represent the portions of software, component programs, or instances of roles that participate in the service application. In another embodiment, one or more of the endpoints 201 and 202 may represent stored data that is accessible to the service application. It will be understood and appreciated that the endpoints 201 and 202 shown in FIG. 2 are merely an example of suitable parts to support the service application and are not intended to suggest any limitation as to the scope of use or functionality of embodiments of the present invention.

Generally, virtual machines 270 and 275 are allocated to the endpoints 201 and 202 of the service application based on demands (e.g., amount of processing load) placed on the service application. As used herein, the phrase "virtual machine" is not meant to be limiting, and may refer to any software, application, operating system, or program that is executed by a processing unit to underlie the functionality of the endpoints 201 and 202. Further, the virtual machines 270 and 275 may include processing capacity, storage locations, and other assets within the data center 225 to properly support the endpoints 201 and 202.

In operation, the virtual machines 270 and 275 are dynamically allocated within resources (e.g., first computing device 255 and second computing device 265) of the data center 225, and endpoints (e.g., the endpoints 201 and 202) are dynamically placed on the allocated virtual machines 270 and 275 to satisfy the current processing load. In one instance, a fabric controller 210 is responsible for automatically allocating the virtual machines 270 and 275 and for placing the endpoints 201 and 202 within the data center 225. By way of example, the fabric controller 210 may rely on a service model (e.g., designed by a customer that owns the service application) to provide guidance on how and when to allocate the virtual machines 270 and 275 and to place the endpoints 201 and 202 thereon. Further, the fabric controller 210 may read instructions from the cloud computing service model when determining whether to enable (turn on) or disable (turnoff) reliability mechanisms integrated with a tunnel-type network connection between the endpoints 201 and 202 and remotely located endpoints. This is more fully discussed below with reference to FIG. 3.

As discussed above, the virtual machines 270 and 275 may be dynamically allocated within the first computing device 255 and second computing device 265. Per embodiments of the present invention, the computing devices 255 and 265 represent any form of computing devices, such as, for example, a server, a personal computer, a desktop computer, a laptop computer, a mobile device, a consumer electronic device, server(s), the computing device 100 of FIG. 1, and the like. In one instance, the computing devices 255 and 265 host and support the operations of the virtual machines 270 and 275, while simultaneously hosting other virtual machines carved out for supporting other tenants of the data center 225, where the tenants include endpoints of other service applications owned by different customers.

Figure 3:
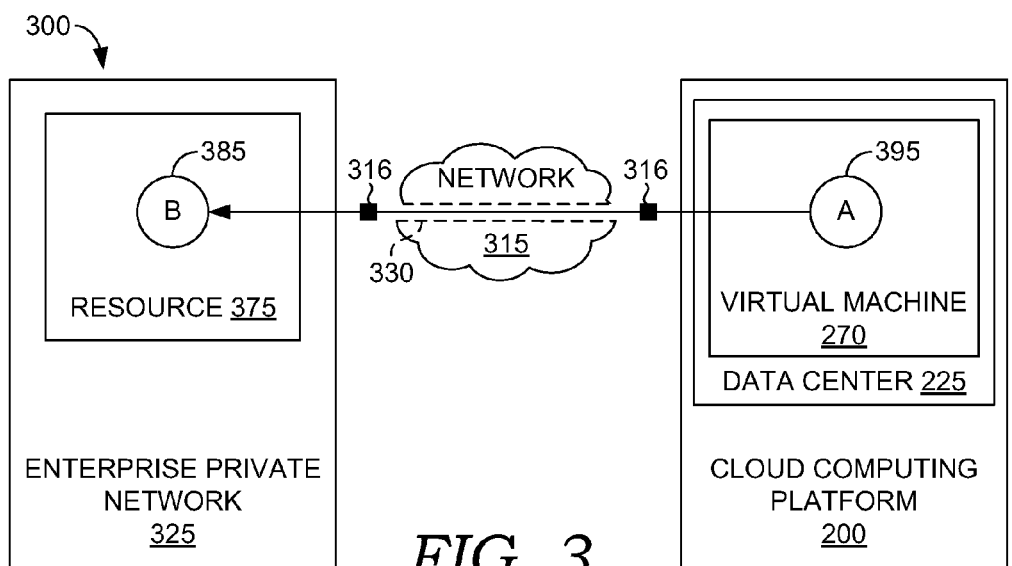
FIG. 3 is block diagram of an exemplary distributed computing environment with a TCP-based tunnel established therein, in accordance with an embodiment of the present invention.

In one aspect, the endpoints 201 and 202 operate within the context of the cloud computing platform 200 and, accordingly, communicate internally through connections dynamically made between the virtual machines 270 and 275, and externally through a physical network topology to resources of a remote network (e.g., resource 375 of the enterprise private network 325 of FIG. 3). The internal connections may involve interconnecting the virtual machines 270 and 275, distributed across physical resources of the data center 225, via a network cloud (not shown). The network cloud interconnects these resources such that the endpoint 201 may recognize a location of the endpoint 202, and other endpoints, in order to establish a communication therebetween. In addition, the network cloud may establish this communication over a tunnel between the end-point of first computing device 255 and second computing device 265 logically linking the endpoints 201 and 202. By way of example, the channels rely on, without limitation, one or more local area networks (LANs) and/or wide area networks (WANs). Such networking environments are commonplace in offices, enterprise-wide computer networks, intranets, and the Internet. Accordingly, the network is not further described herein.

Turning now to FIG. 3, block diagram illustrating an exemplary distributed computing environment 300, with a TCP-based tunnel 330 established therein, is shown in accordance with an embodiment of the present invention. Initially, the distributed computing environment 300 includes an enterprise private network 325 and cloud computing platform 200, as discussed with reference to FIG. 2. The enterprise private network 325 and the cloud computing platform 200 may be connected via a network 315 that is supported by a physical network. As used herein, the phrase "physical network" is not meant to be limiting, but may encompass tangible mechanisms and equipment (e.g., fiber lines, circuit boxes, switches, antennas, IP routers, and the like), as well as intangible communications and carrier waves, that facilitate communication between endpoints at geographically remote locations. By way of example, the physical network (not shown in FIG. 3) may include any wired or wireless technology utilized within the Internet, or available for promoting communication between disparate networks.

Generally, the enterprise private network 325 includes resources, such as resource 375 that are managed by a customer of the cloud computing platform 200. Often, these resources host and support operations of components of the service application owned by the customer. Endpoint B 385 represents one or more of the components of the service application. In embodiments, resources, such as the virtual machine 270 of FIG. 2, are allocated within the data center 225 of FIG. 2 to host and support operations of remotely distributed components of the service application. Endpoint A 395 represents one or more of these remotely distributed components of the service application inside the cloud computing platform 200. In operation, the endpoints A 395 and B 385 work in concert with each other to ensure the service application runs properly. In one instance, working in concert involves transmitting between the endpoints A 395 and B 385 packet(s) 316 of data, or IP data packets, across a network 315 supported by the physical network.

In embodiments, the packet(s) 316 may act to exchange pieces of information between the endpoints A 395 and B 385. Generally the packet(s) 316 are comprised of a sequence of bytes, and further include a header followed by a body. The header describes the packet's 316 destination and, optionally, the routers in the physical network to use for forwarding until the packet 316 arrives at its final destination, such as the resource 375. The body contains the data, or payload, generated at the originator of the packet 316, such as the virtual machine 270.

Typically, the resource 375 and the data center 225 include, or are linked to, some form of a computing unit (e.g., central processing unit, microprocessor, etc.) to support operations of the endpoint(s) and/or component(s) running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the resource 375 and the data center 225 to enable each device to perform a variety of processes and operations. In another instance, the computing unit may encompass a processor (not shown) coupled to the computer-readable medium accommodated by each of the resource 375, and the data center 225. Generally, the computer-readable medium stores, at least temporarily, a plurality of computer software components (e.g., the endpoints A 395 and B 385) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

The TCP-based tunnel 330 ("tunnel 330") may be established to communicate between endpoints assigned to a single service application, such as the service application that includes the endpoints A 395 and B 385, or multiple pairs that serve independent service applications in order to bridge communication between the assigned endpoints across disparate networks. The tunnel 330 uses TCP, which provides a communication service at a transport layer between the application layer and the network/IP layer and may include the application layer in 430 and 440, when it employs HTTP or HTTPS. This is shown in the TCP/IP stacks 430 and 440 of FIG. 4, where the tunnel 330 serves as a logical link between a lower-level channel 425 of the transport layer in the virtual machine 270.

In operation, when the application program desires to send a large chunk of data across the network (e.g., Internet) using IP, instead of breaking the data into IP-sized pieces and issuing a series of IP requests, the application program can issue a single request via the transport layer, which employs TCP, in order to handle the IP details. As such, the transport layer can be thought of as a transport mechanism that ensures complete delivery, e.g., a vehicle with the responsibility to make sure that its contents or payload reach their destination safely and soundly. In instances, ensuring delivery involves reliability mechanisms built into the tunnel 330 that addresses numerous reliability issues and provide a reliable transmission of the data packets 316. These reliability mechanisms operate at a high level, and are concerned with the two end systems (e.g., a Web browser and a Web server).

In particular, TCP provides reliable, ordered delivery of a stream of packets 316 from the endpoint 395 on one computer to the endpoint 385 on another computer by enforcing a set of rules. The set of rules may dictate that the data packets 316 arrives in-order, that the data packets 316 have no errors (i.e. correctness), that duplicate data packets 316 are discarded, and that lost/delayed data packets 316 are resent. This preceding example set of rules may be enforced by a loss-recovery mechanism 505 of FIG. 5, which inspects the data stream to identify any lost packets 316. The reliability mechanisms may also include a congestion-control mechanism 515 of FIG. 5 configured to manage an amount of data that is conveyed within the IP packets, and to generally manage congestion of traffic over the tunnel 330.

Generally, the tunnel 330 represents a logical link that connects endpoints via the transport layer along part of the path between the two end-points or the whole path. In embodiments, the tunnel 330 utilizes IP-HTTPS, SSL, SSTP or another TCP-based tunneling technology that is designed to create a bridging link across IP network boundaries through the network 315. As such, the tunnel 330 ostensibly enables establishing a logical link between endpoints 385 and 395 that is independent of the underlying physical network, thereby allowing them to interact as if positioned adjacently within the data center 225.

Figure 4:
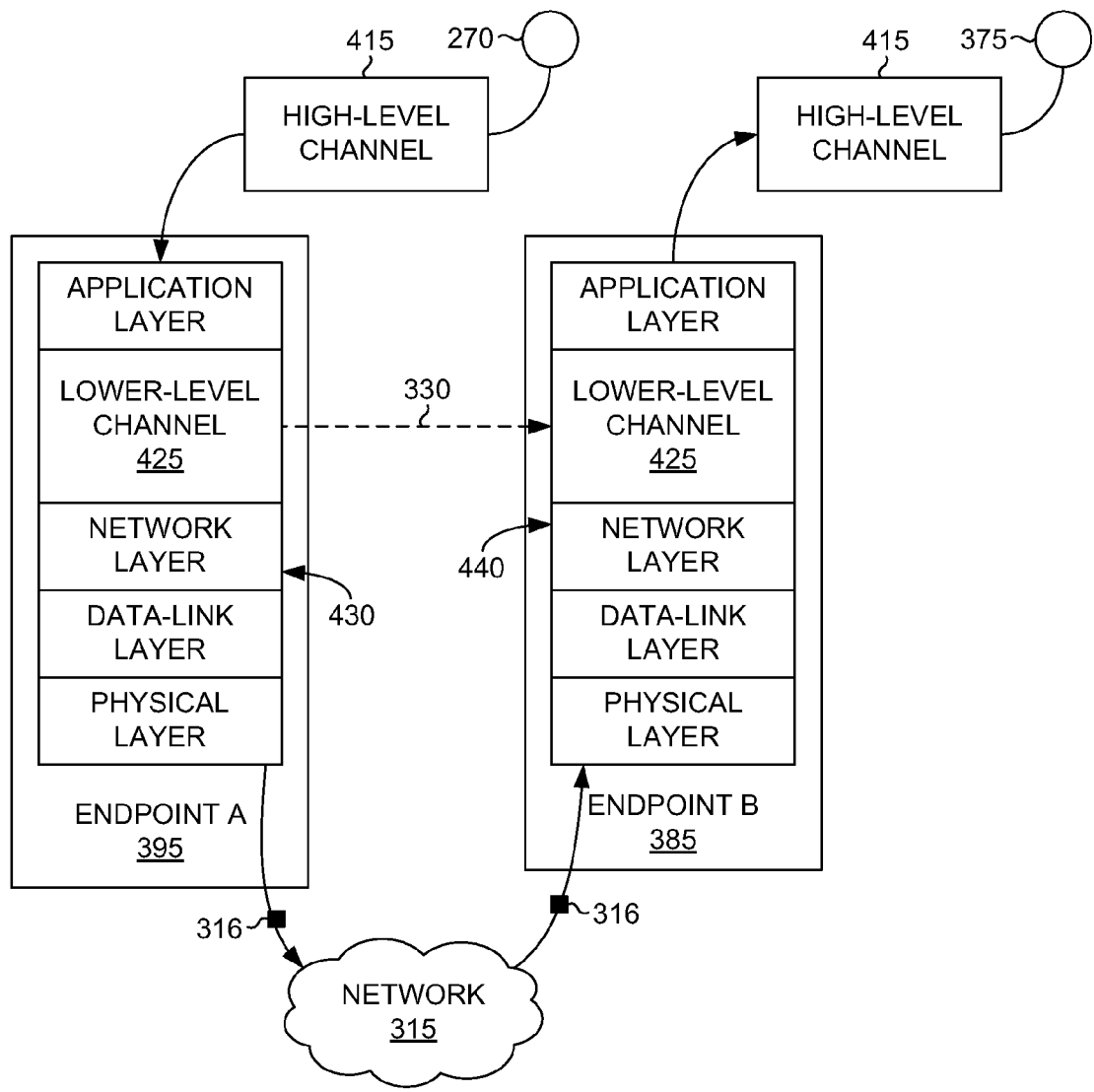
FIG. 4 is a schematic depiction of a layering of TCP-based channels that comprise the TCP-based tunnel, in accordance with an embodiment of the present invention.

In an exemplary embodiment, the tunnel 330 may include one or more TCP-based connections layered on top of one another. Turning to FIG. 4, a schematic depiction of the layering of the TCP-based connections that comprise the tunnel 330 is shown, in accordance with an embodiment of the present invention. As illustrated in FIG. 4, there are two TCP-based connections running on top of each other that are both enforcing the set of rules (discussed supra) on each respective stream of data packets 316 to ensure complete and efficient delivery. These two TCP-based connections include a higher-level channel 415 and a lower-level channel 425. The higher-level channel 415 streams unencapsulated data from the virtual machine 270 to the endpoint A 395 within the data center 225. The unencapsulated data may be encapsulated at the endpoint A 395 and placed on the lower-level channel 425 that conveys data encapsulated in the data packets 316 to the endpoint B 385. Upon arriving at the endpoint B 385, the data packets 316 are received on the lower-level channel 425, unencapsulated, and forwarded to the resource 375 via the higher-level channel 415.

Although two different channels that comprise the tunnel 330 have been described, it should be understood and appreciated that other types of suitable connections that provide for streaming IP data packets may be used, and that embodiments of the present invention are not limited to those channels 415 and 425 described herein The loss-recovery mechanism 505 and the congestion-control mechanism 515 (see FIG. 5) may be both built into, and integrally running on, each of the higher-level channel 415 and the lower-level channel 425. The concurrent active operation of these mechanisms 515 and 525 often results in performance degradation by duplicative, and redundant, efforts. For instance, if the data packet 316 is lost, both mechanisms 515 and 525 within both channels 415 and 425 perform loss recovery and congestion control, respectively. Accordingly, the fabric controller 210 of FIGS. 2 and 5 may be employed to selectively set (turn on or turn off) either of the mechanisms 515 and 525 on either of the channels 415 and 425, independently.

Figure 5:
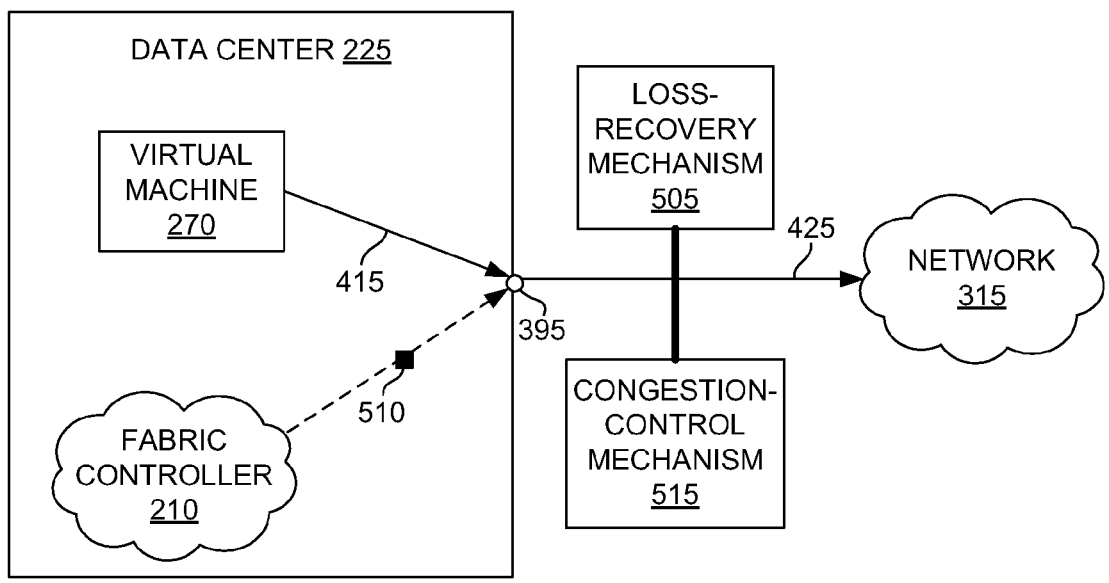
FIG. 5 is a block diagram of an exemplary data center that employs a fabric controller to selectively enable/disable reliability mechanisms built into the TCP-based tunnels, in accordance with embodiments of the present invention.

Referring now to FIG. 5, a block diagram is shown that illustrates an exemplary data center 225 that employs the fabric controller 210 to selectively enable/disable reliability mechanisms 505 and 515 built into the TCP-based tunnels 330, in accordance with embodiments of the present invention. As depicted, data is streamed from the virtual machine 270 over the higher-level channel 415 to the endpoint A 395. The endpoint A 395 encapsulates the streaming data and forwards it over the network 315 via the lower-level channel 415. The fabric controller 210 may convey instructions 510 to the endpoint A 395 that selectively disables the loss-recovery mechanism 505 and/or the congestion-control mechanism 515 built into the lower-level channel 425. These instructions 510 may be prompted by criteria, and are typically issued on a per connection basis of the TCP-based channels 415 and 425 used for the tunnel 330. Per connection, or per socket option, instructions 510 to turn on or off the congestion-control mechanism 505 and/or the loss-recovery mechanism 515, independently, may be invoked by criteria, such as polices that may be provided by the customer (e.g., cloud computing service model, negotiated service-level agreement, and the like). In another embodiment, the selective disablement of the mechanisms 505 and 515 may be invoked by criteria that pertains to an identity of the source endpoint (endpoint A 395), and identity of the destination endpoint (endpoint B 385), a type of data being conveyed, a type of tunnel being established, a type of application/operation being executed, or policy-based information.

In an exemplary embodiment, the fabric controller 210 issues the instructions 510 to disable the mechanisms 505 and 515 running on the lower-level channel 425, while leaving enabled the mechanisms (not shown) running on the higher-level channel 415, thereby providing end to end reliability of a stream of data and reducing dual-mechanism redundancy that causes latency. In one instance, this configuration of disabling mechanisms 505 and 515 of the lower-level channel 425 is provisioned within the fabric controller 210 as the default setting. In this embodiment, the fabric controller 210 will automatically disable the mechanisms 505 and 515 unless there is an input to the contrary.

In embodiments, when disabling the congestion-control mechanism 515, the fabric controller 210 may act on component(s) at the transmitting end (e.g., source endpoint, endpoint A 395 of FIGS. 3-5, or virtual machine 270 of FIGS. 2-5) of the tunnel 330 without making changes on the receiving end (e.g., destination endpoint, endpoint B 385 of FIGS. 3-5, or resource 375 of FIGS. 3 and 4) of the tunnel 330. As such, the congestion-control mechanism 515 can be turned off without any negotiation with the receiving end, and, hence, is backwards compatible. In operation, with reference to FIG. 5, upon acting on the endpoint A 395, this source endpoint sends an amount of data, or rate of data packets 316, designated by a congestion-control mechanism (not shown) of the higher-level channel 415. As such, just the congestion-control mechanism of the higher-level channel 415 controls the amount of data so that the network 315 is not overwhelmed with too much data causing high data loss.

In embodiments, when disabling the loss-recovery mechanism 505, the fabric controller 210 may act on component(s) at the transmitting end (e.g., source endpoint, endpoint A 395 of FIGS. 3-5, or virtual machine 270 of FIGS. 2-5) of the tunnel 330 and on the receiving end (e.g., destination endpoint, endpoint B 385 of FIGS. 3-5, or resource 375 of FIGS. 3 and 4) of the tunnel 330. As such, the loss-recovery mechanism 515 can be turned off through cooperation via negotiation between the transmitting end and the receiving end of the tunnel 330. That is, the receiving end is made aware through negotiation that losses of data packets 316 will not be recovered by the transmitting end. Accordingly, in operation, the receiving end will pass on the delivered data packets 316 even though intermediate data may be lost up to the resource 375, or other destination endpoint of the service application that is downstream of the endpoint B 385. However, if the receiving end of the tunnel 330 does not support turning off the loss-recovery mechanism 515, then the loss-recovery mechanism 515 will typically remain active and enabled.

In one instance of negotiation, the endpoint A 395 may send an initial synchronization (SYN) packet (carrying the negotiation information) to the endpoint B 385, which may acknowledge the receipt of the SYN packet. Further, the endpoint B 385 may reciprocate a handshake with the endpoint A 395 by sending an acknowledgement (SYN-ACK) packet thereto. At this point, when reciprocation occurs, the loss-recovery mechanism 515 of the lower-level channel 425 is disabled, while the loss-recovery mechanism (not shown) of the higher-level channel 415 remains active and enabled, thereby helping recover from any losses or delays during delivery of the data packets 316 by retransmitting any data lost or delayed in the network 315.

Figure 6:
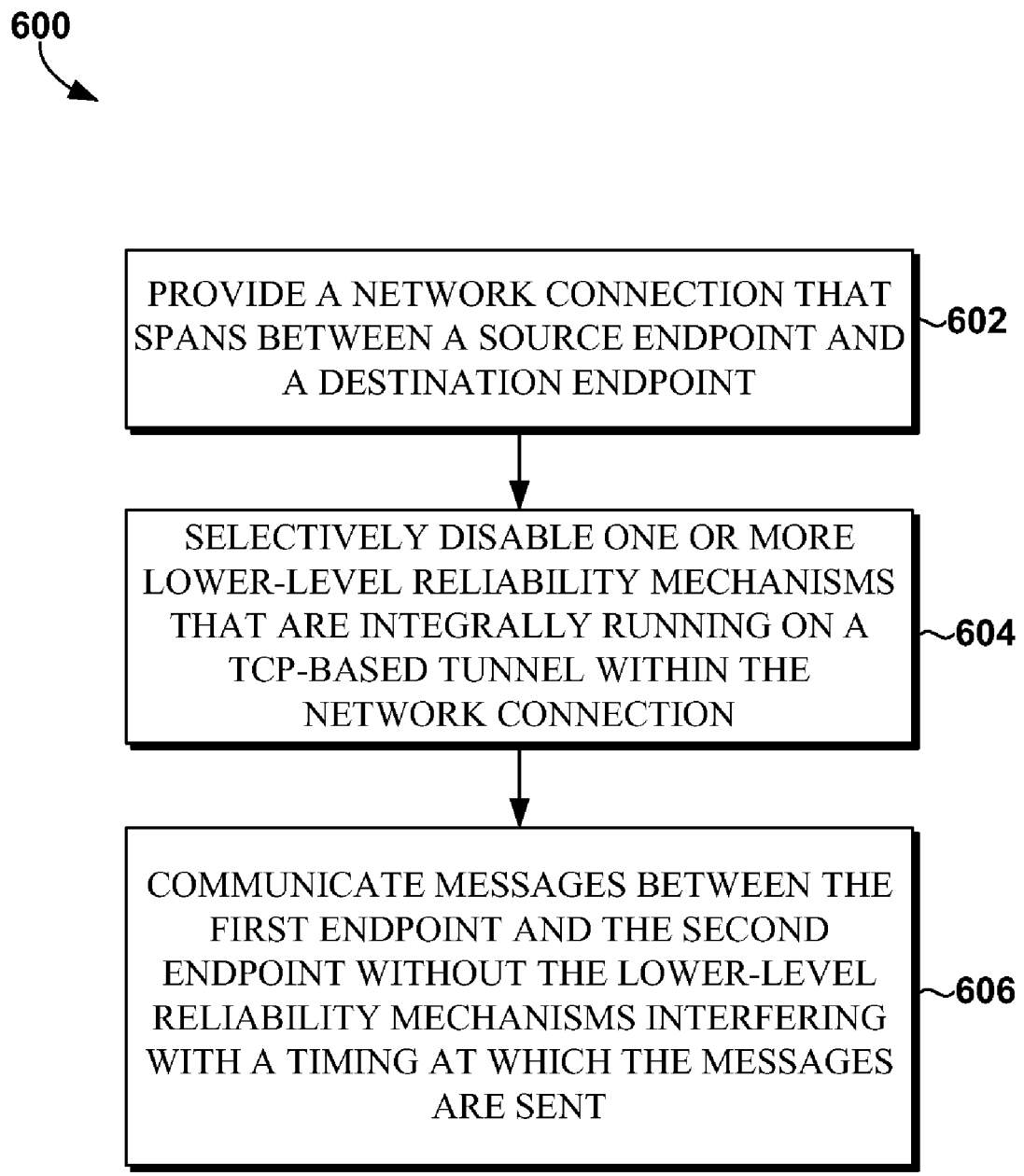
FIGS. 6 and 7 are flow diagrams showing methods for facilitating communication across a network connection established between a plurality of endpoints residing in disparate locations, in accordance with an embodiment of the present invention.

Referring now to FIG. 6, a flow diagram is shown that illustrates a method 600 for facilitating communication across a network connection established between a plurality of endpoints residing in disparate networks, in accordance with an embodiment of the present invention. As indicated at block 602, the network connection is provided. In one instance, the network connection spans between a source endpoint (e.g., endpoint A 395 of FIG. 4) and a destination endpoint (e.g., endpoint B 385 of FIG. 4). As discussed above, the network connection operates as a TCP-based tunnel that bridges the disparate networks (e.g., cloud computing platform 200 and enterprise private network 325 of FIG. 3) at which the source endpoint and the destination endpoint reside, respectively. The method 600, at blocks 604 and 606, further involves the steps of selectively disabling one or more lower-level reliability mechanisms, which are integrally running on the TCP-based tunnel, and communicating messages between the first endpoint and the second endpoint without the lower-level reliability mechanisms interfering with a timing at which the messages are sent. In embodiments, communicating messages between the first endpoint and the second endpoint may specifically include transmitting IP packets from the first endpoint to the second endpoint via the TCP-based tunnel.

In an exemplary embodiment, the act of selectively disabling may be initiated upon event(s) occurring that correspond with predefined criteria. The predefined criteria may be known to the fabric controller, which may selectively disable one or more of the reliability mechanisms (e.g., loss-control mechanism 505 and congestion-control mechanism 515 of FIG. 5) upon detecting the following corresponding events: a predefined port is attempting to send data packets over a tunnel; a new network connection is being established at a predefined data center, virtual machine, or source endpoint; or a new network connection is being established at a predefined resource or destination endpoint.

In another embodiment, a user or client of the data center may be granted rights to exert manual control to turn on/off a group of reliability mechanisms instantiated in the cloud computing platform. In this way, the user of client may decide whether to disable or enable one or more reliability mechanisms dynamically by specifying an endpoint of a tunnel at a UI. Accordingly, the user or client is able to determine whether to avoid performance penalties associated with running duplicative layers of reliable protocol, such as TCP, over tunnels that would normally perform congestion-control and loss-recovery in a redundant and inefficient manner.

Figure 7:
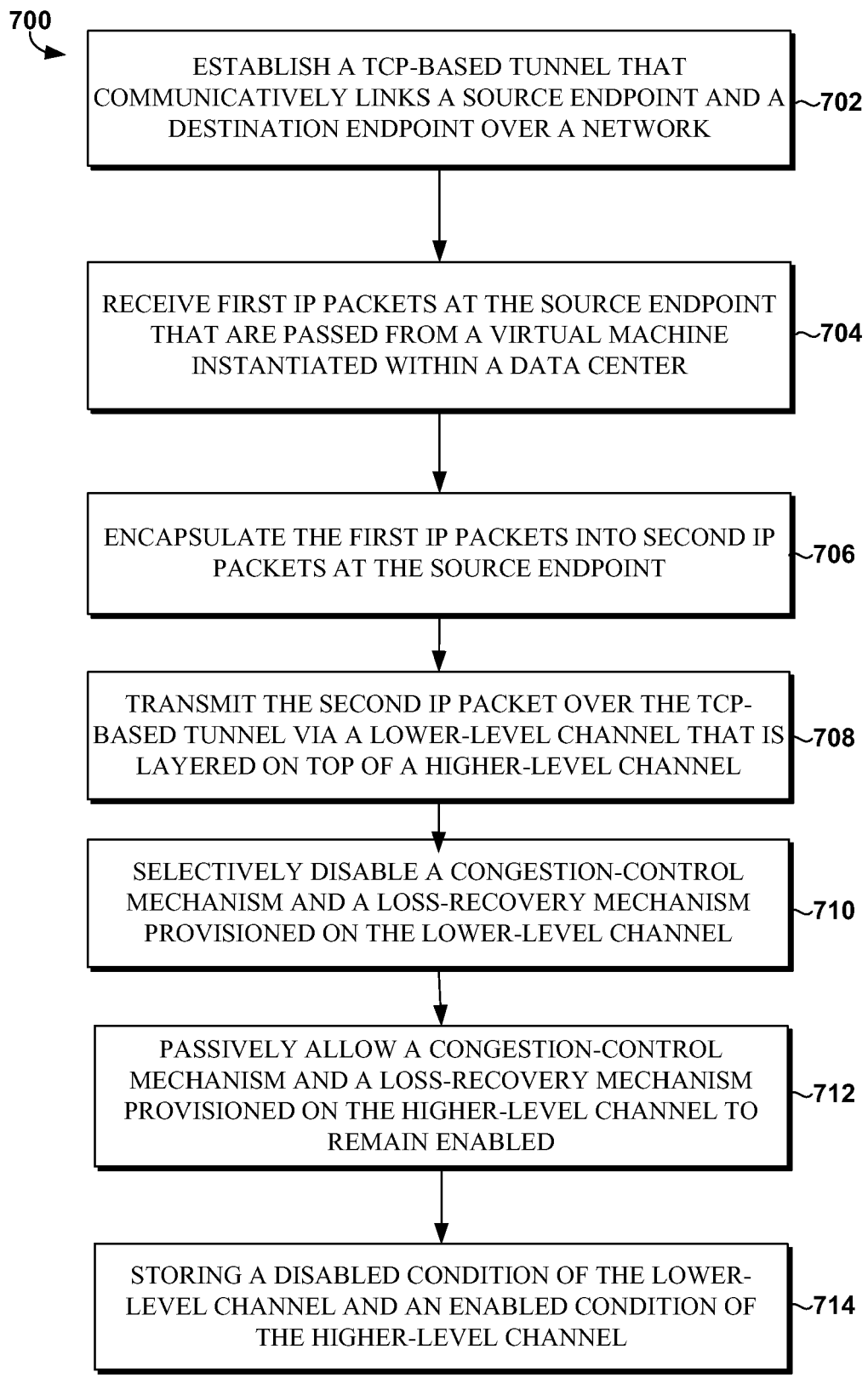

Turning to FIG. 7, a flow diagram is shown that illustrates a method 700 for facilitating communication between a source endpoint and a destination endpoint across a TCP-based tunnel, in accordance with an embodiment of the present invention. As indicated at block 702, the method 700 includes employing a fabric controller to establish the TCP-based tunnel that communicatively links the source endpoint and the destination endpoint over a network or across disparate networks. In embodiments, operation of the source endpoint is supported by a data center (e.g., utilizing the data center 225 of FIG. 3), while operation of the destination endpoint is supported by a remotely located, resource (e.g., utilizing the resource 375 of FIG. 3) residing on a private enterprise network, where the resource may be managed/owned by a client of the data center. The method 700 additionally includes a step of receiving a first stream of IP packets at the source endpoint, which are passed from a virtual machine instantiated within a data center. This step is indicated at block 704. In some embodiments, this first stream of IP packets is carried via a higher-level channel with a first set of reliability mechanisms provisioned thereon. Upon arriving at the source tunnel endpoint, the first stream of IP packets is encapsulated into a second stream of IP packets that is transmitted over the TCP-based tunnel via a lower-level connection, as indicated at blocks 706 and 708. In one configuration of the TCP-based tunnel, the lower-level connection is layered underneath the higher-level channel, thereby operating in tandem to convey the IP packets and to ensure reliability of their conveyance. In this way, the lower-level channel is often provisioned with a second set of reliability mechanisms. In an exemplary embodiment, the first and second sets of reliability mechanisms each include at least a congestion-control mechanism and a loss-recovery mechanism, respectively.

The method 700 continues by performing a step of employing the fabric controller to selectively disable the congestion-control mechanism and the loss-recovery mechanism provisioned on the lower-level channel, as indicated at block 710. The fabric controller is also employed to passively allow the congestion-control mechanism and the loss-recovery mechanism provisioned on the higher-level channel to remain enabled, as indicated at block 712. The disabled condition of the lower-level channel and the enabled condition of the higher-level channel are stored, as indicated at block 714. By way of clarification, the disabled condition represents the disablement of the congestion-control mechanism and the loss-recovery mechanism provisioned on the lower-level channel. On the contrary, the enabled condition represents the enablement of the congestion-control mechanism and the loss-recovery mechanism provisioned on the higher-level channel. The conditions of the channels may be stored at the data center, resource, endpoints, or any other location that is accessible to the fabric controller.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable media having computer-executable instructions embodied thereon that, when executed, perform a method for communicating across a network connection established between a plurality of endpoints residing in disparate networks, the method comprising:
    providing the network connection that spans between a source endpoint and a destination endpoint, wherein the network connection operates as a transport control protocol (TCP)-based tunnel that bridges the disparate networks at which the source endpoint and the destination endpoint reside, respectively;
    selectively disabling one or more lower-level reliability mechanisms that are integrally running on the TCP-based tunnel; and
    communicating messages between the first endpoint and the second endpoint through the tunnel without the one or more lower-level reliability mechanisms interfering with a timing at which the messages are sent.

2. The one or more computer-readable media of claim 1, wherein communicating messages between the first endpoint and the second endpoint comprises transmitting internet protocol (IP) packets from the first endpoint to the second endpoint via the TCP-based tunnel.

3. The one or more computer-readable media of claim 2, wherein the one or more lower-level reliability mechanisms comprise a congestion-control mechanism configured to manage the rate of transmission of IP packets.

4. The one or more computer-readable media of claim 2, wherein the one or more lower-level reliability mechanisms comprise a packet-loss mechanism configured to manage packet loss over the network connection by automatically retransmitting undelivered or delayed IP packets.

5. The one or more computer-readable media of claim 1, wherein the network connection includes a higher-level TCP-based connection that runs on top of a lower-level TCP-based connection.

6. The one or more computer-readable media of claim 5, wherein one or more higher-level reliability mechanisms are integrally running on the higher-level TCP-based connection, and wherein the one or more lower-level reliability mechanisms are integrally running on the lower-level TCP-based connection.

7. The one or more computer-readable media of claim 6, wherein the one or more higher-level reliability mechanisms remain enabled upon selectively disabling the one or more lower-level reliability mechanisms.

8. The one or more computer-readable media of claim 6, wherein the one or more higher-level reliability mechanisms comprise a congestion-control mechanism configured to manage the rate of transmission of IP packets and a packet-loss mechanism configured to manage packet loss over the network connection by automatically retransmitting undelivered or delayed IP packets.

9. The one or more computer-readable media of claim 6, wherein the one or more higher-level reliability mechanisms, when enabled, enforce a set of rules that manage data flow over the higher-level TCP-based connection, and wherein the one or more lower-level reliability mechanisms, when enabled, enforce the same set of rules that manage data flow over the lower-level TCP-based connection.

10. The one or more computer-readable media of claim 1, wherein the one or more lower-level reliability mechanisms are selectively disabled as a function of a cloud computing service model designed, in part, by a client of a cloud computing platform, and wherein the cloud computing platform includes a data center that hosts the source endpoint.

11. The one or more computer-readable media of claim 1, wherein the destination endpoint is hosted by a resource located within a private enterprise network managed by the client.

12. A computer system for communicating across a network connection established between a plurality of endpoints residing in disparate networks, the computer system comprising:
    a data center that hosts a source endpoint, wherein the source endpoint is allocated to an application running on both the data center and a private enterprise network;
    computing device within the private enterprise network that hosts a destination endpoint that is allocated to the application;
    the network connection that spans between the source endpoint and the destination endpoint, wherein the network connection bridges the disparate networks at which the source endpoint and the destination endpoint reside, respectively, and wherein the network connection includes a lower-level connection and a higher-level connection running on top of the lower-level connection; and
    a fabric controller running within the data center for selectively disabling one or more lower-level reliability mechanisms that are integrally running on the network connection, wherein selectively disabling the one or more lower-level reliability mechanisms allows for messages to be communicated across the lower-level connection without the one or more lower-level reliability mechanisms interfering with a timing at which the messages are sent.

13. The computer system of claim 12, wherein the network connection operates as a transport control protocol (TCP)-based tunnel that transports a flow of data directly between the source endpoint and the destination endpoint.

14. The computer system of claim 13, wherein the messages are communicated between the source endpoint and the destination endpoint through the TCP-based tunnel.

15. The computer system of claim 14, wherein the one or more lower-level reliability mechanisms comprise a congestion-control mechanism and a packet-loss mechanism that are built into the lower-level connection.

16. The computer system of claim 15, wherein a congestion-control mechanism and a packet-loss mechanism are built into the higher-level connection.

17. The computer system of claim 16, wherein the fabric controller is further configured for establishing the network connection and for configuring the lower- and higher-level connections within the network connection.

18. The computer system of claim 17, wherein configuring the lower- and higher-level connections within the network connection includes selectively disabling the congestion-control mechanism and the packet-loss mechanism built into the lower-level connection, wherein the fabric controller communicates within the source endpoint when selectively disabling the congestion-control mechanism built into the lower-level connection, and wherein the source endpoint negotiates with the destination endpoint when selectively disabling the packet-loss mechanism built into the lower-level connection.

19. The computer system of claim 17, wherein configuring the lower- and higher-level connections within the network connection includes selectively enabling the congestion-control mechanism and the packet-loss mechanism built into the higher-level connection.

20. A computerized method for communicating between a source endpoint and a destination endpoint across a communication network, the method comprising:
    detecting a flow of data across the network connection that spans between the source endpoint and the destination endpoint, wherein the network connection bridges disparate networks at which the source endpoint and the destination endpoint reside, respectively;
    selectively disabling one or more lower-level reliability mechanisms that are integrally running on the network connection, wherein the network connection includes a lower-level connection and a higher-level connection running on top of the lower-level connection, wherein the one or more lower-level reliability mechanisms comprise a congestion-control mechanism and a packet-loss mechanism built into the lower-level connection, wherein the congestion-control mechanism is configured to manage the rate of transmission of IP packets; and wherein the packet-loss mechanism is configured to manage packet loss over the network connection by automatically retransmitting undelivered or delayed IP packets;
    selectively enabling one or more higher-level reliability mechanisms that are integrally running on the network connection, wherein the one or more higher-level reliability mechanisms comprise the congestion-control mechanism and the packet-loss mechanism built into the higher-level connection; and
    allowing the data flow to occur between the source endpoint and the destination endpoint over the network connection without the one or more lower-level reliability mechanisms interfering with a timing at which the data flow is transmitted.

* * * * *